US011133501B2

(12) United States Patent
Kim et al.

(10) Patent No.: US 11,133,501 B2
(45) Date of Patent: *Sep. 28, 2021

(54) COMPOSITE POSITIVE ACTIVE MATERIAL, METHOD OF PREPARING THE SAME, AND LITHIUM SECONDARY BATTERY INCLUDING POSITIVE ELECTRODE INCLUDING THE SAME

(71) Applicant: SAMSUNG SDI CO., LTD., Yongin-si (KR)

(72) Inventors: Sanghoon Kim, Yongin-si (KR); Kwanghwan Cho, Yongin-si (KR); Eunsung Lee, Yongin-si (KR); Dohyung Park, Yongin-si (KR); ILseok Kim, Yongin-si (KR); Sol Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 857 days.

This patent is subject to a terminal disclaimer.

(21) Appl. No.: 15/337,541

(22) Filed: Oct. 28, 2016

(65) Prior Publication Data
US 2017/0125809 A1    May 4, 2017

(30) Foreign Application Priority Data

Oct. 30, 2015 (KR) .................. 10-2015-0152524

(51) Int. Cl.
*H01M 4/131* (2010.01)
*H01M 4/525* (2010.01)
(Continued)

(52) U.S. Cl.
CPC ............ *H01M 4/525* (2013.01); *C01G 53/00* (2013.01); *C01G 53/006* (2013.01); *C01G 53/42* (2013.01);
(Continued)

(58) Field of Classification Search
CPC .... H01M 4/525; H01M 10/0525; H01M 2/02; H01M 4/131; H01M 2/022; C01G 53/00;
(Continued)

(56) References Cited

U.S. PATENT DOCUMENTS

| 7,670,723 B2 | 3/2010 | Ohzuku et al. |
| 2006/0127769 A1* | 6/2006 | Fujimoto ........... C01G 45/1228 |
| | | 429/231.1 |

(Continued)

FOREIGN PATENT DOCUMENTS

| CN | 101585560 | * 11/2009 |
| CN | 101585560 A | 11/2009 |

(Continued)

OTHER PUBLICATIONS

JP 2001266876MT (Year: 2001).*

(Continued)

*Primary Examiner* — Alexander Usyatinsky
(74) *Attorney, Agent, or Firm* — Lee IP Law, P.C.

(57) ABSTRACT

A composite positive active material includes a lithium nickel cobalt aluminum composite oxide. A full width at half maximum (FWHM) of a peak of a (104) plane of the lithium nickel cobalt aluminum composite oxide is 0.15 or less and an FWHM of a peak of a (108) plane of the lithium nickel cobalt aluminum composite oxide is 0.15 or less, the peaks being obtained by X-ray diffraction analysis using a CuKα X-ray. A method of preparing the composite positive active material, and a lithium secondary battery including a positive electrode including the composite positive active material are disclosed.

13 Claims, 4 Drawing Sheets

(51) Int. Cl.
    *C01G 53/00*     (2006.01)
    *H01M 50/107*     (2021.01)
    *H01M 10/0525*     (2010.01)

(52) U.S. Cl.
    CPC ............ *C01G 53/50* (2013.01); *H01M 4/131* (2013.01); *H01M 10/0525* (2013.01); *H01M 50/107* (2021.01); *C01P 2002/60* (2013.01); *C01P 2002/70* (2013.01); *C01P 2002/72* (2013.01); *C01P 2002/74* (2013.01); *C01P 2004/62* (2013.01); *C01P 2004/64* (2013.01); *C01P 2006/40* (2013.01)

(58) Field of Classification Search
    CPC ...... C01G 53/42; C01G 53/006; C01G 53/50; C01P 2006/40; C01P 2002/74; C01P 2002/60; C01P 2002/70; C01P 2002/72; C01P 2004/62; C01P 2004/64
    See application file for complete search history.

(56) References Cited

U.S. PATENT DOCUMENTS

| | | | | |
|---|---|---|---|---|
| 2008/0305397 | A1* | 12/2008 | Kobayashi | H01M 4/13 429/231.5 |
| 2013/0108921 | A1* | 5/2013 | Kase | H01M 4/485 429/211 |
| 2015/0147653 | A1 | 5/2015 | Nomura et al. | |
| 2015/0380736 | A1* | 12/2015 | Park | H01M 4/485 252/182.1 |
| 2016/0118648 | A1* | 4/2016 | Gunji | C01G 53/50 429/223 |
| 2016/0164094 | A1* | 6/2016 | Takei | H01M 4/525 429/223 |

FOREIGN PATENT DOCUMENTS

| | | | |
|---|---|---|---|
| CN | 103715424 | A | 4/2014 |
| CN | 106159220 | * | 11/2016 |
| EP | 2 824 735 | A2 | 1/2015 |
| EP | 3 032 618 | A2 | 6/2016 |
| JP | 2001266876 | * | 9/2001 |
| JP | 3827545 | B2 | 9/2006 |
| JP | 2009151959 | * | 8/2009 |
| KR | 10-2005-0096019 | A | 10/2005 |
| KR | 10-0725399 | B1 | 6/2007 |
| KR | 10-2014-0100284 | A | 8/2014 |
| WO | WO 2012-124242 | A | 9/2012 |

OTHER PUBLICATIONS

JP2009151959 MT (Year: 2009).*
CN 106159220 MT (Year: 2016).*
CN 101585560 MT (Year: 2009).*
16196430,Decision_to_grant_a_European_patent,dated Jul. 19, 2018 (Year: 2018).*
Li, et al., "Stoichiometric Synthesis of Pure NiFe$_2$O$_4$ Spinel from Layered Double Hydroxide Precursors for Use as the Anode Material in Lithium-Ion Batteries" Journal of Physics and Chemistry of Solids vol. 67, Issues 5-6, May-Jun. 2006, pp. 1286-1290.
Extended European Search Report issued by the European Patent Office dated Feb. 7, 2017 in the examination of the European Patent Application No. 16 196 430.9.
Indian Office action dated Jul. 22, 2020.
Chinese Office action dated Aug. 4, 2020.
Examination Report issued by the European Patent Office dated Sep. 14, 2017 in the examination of the European Patent Application No. 16 196 430.9.
Chinese Office action dated Apr. 2, 2021.

* cited by examiner

COMPOSITE POSITIVE ACTIVE MATERIAL, METHOD OF PREPARING THE SAME, AND LITHIUM SECONDARY BATTERY INCLUDING POSITIVE ELECTRODE INCLUDING THE SAME

CROSS-REFERENCE TO RELATED APPLICATION

Korean Patent Application No. 10-2015-0152524, filed on Oct. 30, 2015, in the Korean Intellectual Property Office, and entitled: "Composite Positive Active Material, Method of Preparing the Same, and Lithium Secondary Battery Including Positive Electrode Including the Same," is incorporated by reference herein in its entirety.

BACKGROUND

1. Field

Embodiments relate to composite positive active materials, methods of preparing the same, and lithium secondary batteries including positive electrodes including the same.

2. Description of the Related Art

Lithium cobalt oxides are widely used as positive active materials of lithium secondary batteries. Nickel-based lithium composite oxides are less expensive in terms of preparation costs and may have superior properties as compared to lithium cobalt oxides.

SUMMARY

Embodiments are directed to a composite positive active material comprising a lithium nickel cobalt aluminum composite oxide. A full width at half maximum (FWHM) of a peak of a (104) plane of the lithium nickel cobalt aluminum composite oxide is 0.15 or less and an FWHM of a peak of a (108) plane of the lithium nickel cobalt aluminum composite oxide is 0.15 or less, the peaks being obtained by X-ray diffraction analysis using a CuKαX-ray.

An amount of aluminum in the composite positive active material may be in a range of about 5 mol % to about 10 mol % with respect to a total amount of cobalt, nickel and aluminum.

A cation mixing ratio in a lithium layer of the composite positive active material may be 5.0% or less based on a total amount of lithium sites.

The composite positive active material may have an average crystal size of 800 nm or less.

The composite positive active material may be a compound represented by Formula 1 below:

$$LiNi_aCo_bAl_cO_2,$$ [Formula 1]

wherein in Formula 1, $0.7 \leq a < 1.0$, $0 < b \leq 0.3$, and $0.05 \leq c \leq 0.1$.

The composite positive active material may be $LiNi_{0.8}Co_{0.1}Al_{0.1}O_2$, $LiNi_{0.7}Co_{0.2}Al_{0.1}O_2$, $LiNi_{0.7}Co_{0.25}Al_{0.05}O_2$, $LiNi_{0.8}Co_{0.15}Al_{0.05}O_2$, or $LiNi_{0.9}Co_{0.05}Al_{0.5}O_2$.

An amount of residual lithium in the composite positive active material may be in a range of about 0.5 weight % to about 0.6 weight %.

Embodiments are also directed to a method of preparing a composite positive active material including performing a first heat treatment on nickel cobalt oxide represented by Formula 2 below and aluminum oxide under an oxidative gas atmosphere to obtain nickel cobalt aluminum oxide represented by Formula 3 below, and performing a second heat treatment on the nickel cobalt aluminum oxide and a lithium precursor under an oxidative gas atmosphere to obtain the composite positive active material.

$$Ni_xCo_{1-x}O$$ [Formula 2]

wherein in formula 2, $0.7 \leq x < 1.0$.

$$Ni_xCo_{1-x-y}Al_yO_2$$ [Formula 3]

wherein in formula 3, $0.7 \leq x < 1.0$ and $0.05 \leq y \leq 0.1$.

The first heat treatment may be performed under an oxidative gas atmosphere at a temperature between about 400° C. and about 1,200° C.

The second heat treatment may be performed under an oxidative gas atmosphere at a temperature between about 400° C. and about 1,200° C.

Embodiments are also directed to a lithium secondary battery including a positive electrode including a composite positive active material including a lithium nickel cobalt aluminum composite oxide, wherein a full width at half maximum (FWHM) of a peak for a (104) plane of the lithium nickel cobalt aluminum composite oxide is 0.15 or less, and an FWHM of a peak for a (108) plane of the lithium nickel cobalt aluminum composite oxide is 0.15 or less, the peaks being obtained by X-ray diffraction analysis using a CuKαX-ray.

An amount of aluminum in the composite positive active material may be in a range of about 5 mol % to about 10 mol % with respect to a total amount of nickel, cobalt and aluminum.

A cation mixing ratio in a lithium layer of the composite positive active material may be 5.0% based on a total amount of lithium sites.

The composite positive active material may have an average crystal size of 800 nm or less.

The composite positive active material may be a compound represented by Formula 1 below:

$$LiNi_aCo_bAl_cO_2$$ [Formula 1]

wherein $0.7 \leq a < 1.0$, $0 < b \leq 0.3$, and $0.05 \leq c \leq 0.1$.

The composite positive active material may be $LiNi_{0.8}Co_{0.1}Al_{0.1}O_2$, $LiNi_{0.7}Co_{0.2}Al_{0.1}O_2$, $LiNi_{0.7}Co_{0.25}Al_{0.05}O_2$, $LiNi_{0.8}Co_{0.15}Al_{0.05}O_2$, or $LiNi_{0.9}Co_{0.05}Al_{0.05}O_2$.

An amount of residual lithium in the composite positive active material may be in a range of about 0.5 wt % to about 0.6 wt %.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
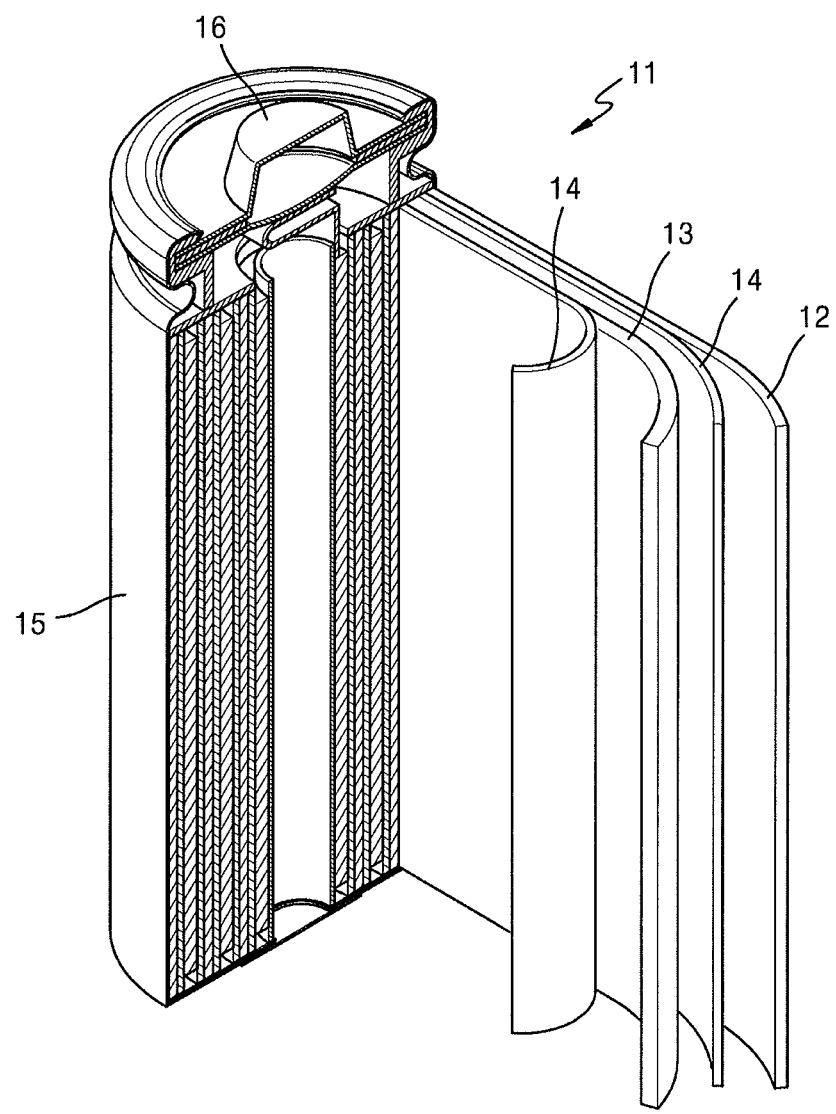
FIG. 1 illustrates a diagram of a lithium secondary battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration.

Expressions such as "at least one of," when preceding a list of elements, modify the entire list of elements and do not modify the individual elements of the list.

Hereinafter, composite positive active materials according to exemplary embodiments and lithium secondary batteries including positive electrodes including the same will be described in further detail.

An embodiment of the present disclosure provides a composite positive active material including lithium nickel cobalt aluminum composite oxide having a full width at half maximum (FWHM) of a peak for a (104) plane of 0.15 or less and an FWHM of a peak for a (108) plane of 0.15 or less, the peaks being obtained by X-ray diffraction analysis using a CuKα X-ray.

In a composite positive active material according to an embodiment, the FWHM of the peak for a (104) plane may be, for example, in the range of about 0.12 to about 0.15, and the FWHM of the peak for a (108) plane may be in the range of about 0.12 to about 0.15.

The terms "FWHM (104)" and "FWHM (108)" as used herein refer to the width at a halfway point of the maximum height (i.e., FWHM) of the peak for a (104) plane and the width at a halfway point of the maximum height (i.e., FWHM) of the peak for a (108) plane, respectively. The peaks for the (104) and (108) planes provide information with respect to a layered and cubic rock-salt structure. The peak for a (104) plane appears at 2θ of about 42° to about 46°. The peak for a (108) plane appears at 2θ of about 62° to about 66°. When the FWHM (104) and the FWHM (108) are within the ranges described above, the composite positive active material may have a very high crystallinity and a very low cation mixing ratio. Thus, when such a composite positive active material is used, a lithium secondary battery with high capacity and long lifespan may be manufactured. Crystallinity increases in a stable layered structure and thus lithium transfer is less hindered. When the composite positive active material described above is used, a lithium secondary battery with enhanced lifespan characteristics may be manufactured.

The amount of aluminum (Al) in the composite positive active material may be from about 5 mol % to about 10 mol %, or, for example, from about 8 mol % to about 9.5 mol %, with respect to the total amount of nickel, cobalt and aluminum.

A cation mixing ratio of the composite positive active material may be 5.0% or less, or, for example, from about 2.0% to about 4.5%, or, for example, from about 2.4% to about 3.0%, with respect to the total amount of lithium sites in the lithium layer. The composite positive active material having the Al amount ranges described above and the cation mixing ratio ranges described above may exhibit a stabilized crystal structure even at a high heat treatment temperature. Thus, issues such as collapsing of crystal structures due to intercalation and deintercalation of lithium may be addressed and excellent capacity characteristics and high safety may be achieved. When such a composite positive active material is used, a lithium secondary battery with improved lifespan characteristics may be manufactured.

The composite positive active material may be a compound represented by Formula 1 below:

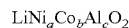  [Formula 1]

wherein in formula 1, 0.7≤a<1.0, 0<b≤0.3, and 0.05≤c≤0.1.

The composite positive active material of Formula 1 may be a nickel-rich lithium nickel cobalt aluminum composite oxide.

In Formula 1, a may be, for example, 0.7 to 0.9, b may be 0.05 to 0.25, for example, 0.1 to 0.2, and c may be 0.05 to 0.1

In formula 1, 0.7≤a<0.95,

For example, the composite positive active material may be $LiNi_{0.8}Co_{0.1}Al_{0.1}O_2$, $LiNi_{0.7}Co_{0.02}Al_{0.1}O_2$, $LiNi_{0.7}Co_{0.25}Al_{0.05}O_2$, $LiNi_{0.8}Co_{0.15}Al_{0.05}O_2$, or $LiNi_{0.9}Co_{0.05}Al_{0.05}O_2$.

The composite positive active material may have an average crystal size of 800 nm or less, or, for example, from about 0.01 nm to about 800 nm. When such a composite positive active material is used, a positive electrode and lithium secondary battery having enhanced lifespan characteristics may be manufactured.

The average crystal size of the composite positive electrode active material is measured by X-ray diffraction analysis. X-ray diffraction analysis is performed on the composite positive active material by using an X'pert pro (PANalytical) diffractometer using CuKα radiation (1.54056 Å). Here, sealed tube type (using Cu Kα-ray, Ni filter) is used as X-Ray source, output is 40 kV 40 mA, and scanning rate is about 0.1°/step.

The X-ray diffraction analysis is performed of (100) and (104) crystal planes of the composite positive electrode active material so as to detect the diffracted ray of the composite positive electrode active material having a layered structure.

The average crystal size of the composite positive electrode active material is calculated by Scherrer equation below:

Scherrer equation: $D = \lambda k \beta \cos \theta$

In the Scherrer equation, D denotes Average crystal size, λ denotes a wavelength of X-ray, k is Scherrer constant (0.9), β is the full-width-at-half-maximum (FWHM, radian), and Bragg diffraction angle (θ) of crystal planes (hkl).

Hereinafter, a method of preparing the composite positive active material, according to an embodiment, will be described.

Nickel cobalt oxide represented by Formula 2 below may be mixed with aluminum oxide and a first heat treatment may be performed thereon under an oxidative gas atmosphere to obtain a nickel cobalt aluminum oxide represented by Formula 3 below:

  [Formula 2]

wherein in formula 2, 0.7≤x<1.0.

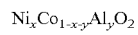  [Formula 3]

wherein in formula 3, 0.7≤x<1.0 and 0.05≤y≤0.1.

The mixing process may be performed by mechanical mixing using a ball mill, a Banbury mixer, a homogenizer, or the like. The mechanical mixing may be performed using zirconia balls or the like. The mechanical mixing time may vary. For example, the mechanical mixing time may be from about 20 minutes to about 10 hours, or, for example, from about 30 minutes to about 3 hours.

During mechanical mixing, mixing efficiency may be increased by adding an alcohol solvent such as ethanol or the like.

The amount of the solvent may be from about 100 to about 3,000 parts by weight with respect to the total amount 100 parts by weight of the nickel cobalt oxide of Formula 2 and the aluminum oxide. When the amount of the solvent is within the range described above, a mixture in which the nickel cobalt oxide and the aluminum oxide are evenly dissolved may be obtained. The time for the first heat treatment process may vary depending upon a heat treatment temperature. For example, the time for the first heat treatment process may be, for example, from about 3 hours to about 20 hours.

The first heat treatment process may be performed under an oxidative gas atmosphere at a temperature ranging from about 400° C. to about 1,200° C., or, for example, from about 50° C. to about 900° C. (e.g. about 500° C. to about 900° C., such as about 600° C. to about 800° C., or about 700° C.).

In an embodiment, the composite positive active material may be prepared using a general preparation method such as spray pyrolysis or the like, instead of, or in addition to, the solid phase method described above.

The nickel cobalt aluminum oxide may be mixed with a lithium precursor and a second heat treatment may be performed thereon under an oxidative gas atmosphere to obtain a composite positive active material represented by Formula 1 below:

$$LiNi_aCo_bAl_cO_2 \qquad [\text{Formula 1}]$$

wherein in Formula 1, $0.7 \leq a < 1.0$, $0 < b \leq 0.3$, and $0.05 \leq c \leq 0.1$.

In Formula 1, a, b, and c may respectively correspond to x, 1-x-y and y in the nickel cobalt aluminum oxide represented by Formula 3, from which the composite positive active material is made, the nickel cobalt aluminum oxide represented by Formula 3 being made from the nickel cobalt oxide represented by Formula 2.

$$Ni_xCo_{1-x}O \qquad [\text{Formula 2}]$$

wherein in Formula 2, $0.7 \leq x < 1.0$.

$$Ni_xCo_{1-x-y}Al_yO_2 \qquad [\text{Formula 3}]$$

wherein in formula 3, $0.7 \leq x < 1.0$ and $0.05 \leq y \leq 0.1$.

The second heat treatment process may be performed under an oxidative gas atmosphere at a temperature ranging from about 400° C. to about 1,200° C., or, for example, from about 50° C. to about 900° C.

The term "oxidative gas atmosphere" as used herein refers to an air or oxygen atmosphere. The term "oxygen atmosphere" refers to an atmosphere formed using oxygen alone or a mixed gas of oxygen and an inert gas. The inert gas may be nitrogen, argon, helium, or the like.

The lithium precursor may be a lithium precursor commonly used in the art, such as, for example, lithium hydroxide (LiOH), lithium carbonate ($Li_2CO_3$), lithium sulfate ($Li_2SO_4$), lithium nitrate ($LiNO_3$), or the like.

The mixing of the nickel cobalt aluminum oxide and the lithium precursor may be performed in the same manner as the mixing of the nickel cobalt oxide of Formula 2 and the aluminum oxide.

The amounts of the nickel cobalt oxide of Formula 2, the aluminum oxide, and the lithium precursor may be stoichiometrically controlled to obtain the composite positive active material of Formula 1, which is a target material.

The nickel cobalt oxide of Formula 2 may be obtained according to the following processes.

A nickel precursor may be mixed with a cobalt precursor and heat-treated under an oxidative gas atmosphere, thereby obtaining the nickel cobalt oxide of Formula 2.

The nickel precursor may be nickel oxide, nickel acetate, nickel hydroxide, nickel nitrate, or the like. The cobalt precursor may be cobalt oxide, cobalt acetate, cobalt hydroxide, cobalt nitrate, or the like. For example, nickel oxide and cobalt oxide may be used as the nickel precursor and the cobalt precursor, respectively. The amounts of the nickel precursor and the cobalt precursor may be stoichiometrically controlled to obtain the nickel cobalt oxide of Formula 2.

The heat treatment process may be performed under an oxidative gas atmosphere at a temperature ranging from about 400° C. to 1,200° C., or, for example, 900° C. The heat treatment time may vary according to the heat treatment temperature and may be, for example, from about 5 minutes to about 20 hours.

The nickel cobalt oxide of Formula 2 may be, for example, $Ni_{0.7}Co_{0.3}O$, $Ni_{0.8}Co_{0.2}O$, or $Ni_{0.9}Co_{0.1}O$. The nickel cobalt aluminum oxide of Formula 3 may be, for example, $Ni_{0.7}Co_{0.25}Al_{0.05}O_2$, $Ni_{0.7}Co_{0.2}Al_{0.1}O_2$, $Ni_{0.8}Co_{0.15}Al_{0.05}O_2$, $Ni_{0.8}Co_{0.1}Al_{0.1}O_2$, or $Ni_{0.9}Co_{0.05}Al_{0.05}O_2$.

The composite positive active material prepared according to the processes described above may have a small amount (for example about 0.5 wt % to about 0.6 wt %) of residual lithium and accordingly, may generate little or no gas. Thus, the composite positive active material may have high safety. In addition, formation of nickel oxide or the like at a surface of the composite positive active material may be reduced or prevented. Thus, lifespan degradation of the lithium secondary battery using the composite positive active material may be reduced or prevented.

In an embodiment, the composite positive active material may have a coating layer at a surface thereof. When a positive electrode including such a composite positive active material with a coating layer at a surface thereof is employed, charge and discharge characteristics, lifespan characteristics, and high-voltage characteristics may be enhanced.

According to an embodiment, the coating layer may include at least one selected from a conductive material, a metal oxide, and an inorganic fluoride. The conductive material may be at least one selected from a carbonaceous material, a conductive polymer, ITO, $RuO_2$, and ZnO. The carbonaceous material may be graphite such as natural graphite or artificial graphite that is in amorphous, plate, flake, spherical, or fibrous form, or an amorphous carbon such as soft carbon (carbon calcined at low temperatures), hard carbon, a mesophase pitch carbide, a calcined coke, graphene, carbon black, carbon nanotubes, or carbon fiber.

Examples of the carbonaceous material include, for example, carbon nanotubes, fullerene, graphene, and carbon fiber. The conductive polymer may be polyaniline, polythiophene, polypyrrole, or a mixture thereof. The metal oxide may be, for example, at least one selected from silica ($SiO_2$), alumina ($Al_2O_3$), zirconium oxide ($ZrO_2$), and titanium oxide ($TiO_2$). The inorganic fluoride may be at least one selected from $AlF_3$, CsF, KF, LiF, NaF, AgF, $AgF_2$, $BaF_2$, $CaF_2$, $CuF_2$, $MgF_2$, $ZnF_2$, $AlF_3$, and $BF_3$.

According to an embodiment, the coating layer may be formed as a continuous layer or a discontinuous layer. For example, the coating layer may be an island-type layer.

According to an embodiment, a lithium secondary battery including a positive electrode including the composite positive active material described above is provided.

The positive electrode may be fabricated according to the following processes.

A positive active material composition, in which the composite positive active material, a binder, and a solvent are mixed, may be prepared. The positive active material composition may further include a conductive agent.

The positive active material composition may be directly coated onto a metal current collector, and the coated current collector may be dried to complete the fabrication of a positive electrode plate. In an embodiment, the positive active material composition may be cast onto a separate support. A film including the positive active material composition may be separated from the support and laminated onto a metal current collector to complete the fabrication of a positive electrode plate.

In the manufacture of the positive electrode, an additional positive active material that is a positive active material commonly used in lithium secondary batteries, may be further used.

The additional positive active material may be a suitable positive active material used in the art. In some implementations, the additional positive active material may be at least one selected from the group of lithium cobalt oxide, lithium nickel cobalt manganese oxide, lithium nickel cobalt aluminum oxide, lithium iron phosphate, and lithium manganese oxide.

For example, the additional positive active material may be a compound represented by any one of Formulae: $Li_aA_{1-b}B'_bD_2$ where $0.90 \leq a \leq 1.8$ and $0 \leq b \leq 0.5$; $Li_aE_{1-b}B'_1O_{2-c}D_c$ where $0.90 \leq a \leq 1.8$, $0 \leq b \leq 0.5$, and $0 \leq c \leq 0.05$; $LiE_{2-b}B'_bO_{4-c}D_c$ where $0 \leq b \leq 0.5$ and $0 \leq c \leq 0.05$; $Li_aNi_{1-b-c}Co_bB'_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Co_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_{1-b-c}Co_bB'_cO_{2-\alpha}F'_2$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cO_{2-\alpha}F'_2$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the formulae above, A, B', D, E, F', G, Q, I', and J are variables representing elements as defined below. (The ' symbol is added to B', F', I' to avoid confusion with the chemical symbols for boron, fluorine, and iodine.) In more detail, A is Ni, Co, Mn, or a combination thereof, B' is Al, Ni, Co, Mn, Cr, Fe, Mg, Sr, V, a rare earth element, or a combination thereof, D is O, F, S, P, or a combination thereof. E is Co, Mn, or a combination thereof, F' is F, S, P, or a combination thereof. G is Al, Cr, Mn, Fe, Mg, La, Ce, Sr, V, or a combination thereof. Q is Ti, Mo. Mn, or a combination thereof. I' is Cr, V, Fe, Sc, Y, or a combination thereof, and J is V, Cr, Mn, Co, Ni, Cu, or a combination thereof.

The amount of the additional positive active material may be about 1 part by weight 50 parts by weight based on 100 parts by weight of the composite positive active material.

In the positive active material composition, the binder may be polyamide imide, polyacrylic acid (PAA), polyvinylidene fluoride, polyvinylalcohol, carboxymethylcellulose (CMC), starch, hydroxypropylcellulose, regenerated cellulose, polyvinylpyrrolidone, polytetrafluoroethylene, polyethylene, polypropylene, lithium polyacrylate, lithium polymethacrylate, ethylene-propylene-diene monomer (EPDM), sulfonated EPDM, styrene butadiene rubber, fluoride rubber, various copolymers, or the like.

The conductive agent may include, for example, at least one carbonaceous conductive agent selected from the group of carbon black, carbon fiber, and graphite. The carbon black may be, for example, one selected from the group of acetylene black, Ketjen black, super P, channel black, furnace black, lamp black, and thermal black. The graphite may be natural graphite or artificial graphite.

The solvent may be a suitable commonly used solvent. In some implementations, the solvent may be N-methylpyrrolidone, butanol, acetonitrile, acetone, methanol, ethanol, N-methyl-2-pyrrolidone (NMP), or the like. In an embodiment, pores may be formed in an electrode plate by further adding a plasticizer to the positive active material composition and/or a negative active material composition.

The amounts of the positive active material, the conductive agent, the binder, and the solvent may be the same level as those used in a general lithium secondary battery. At least one of the conductive agent, the binder, and the solvent may be omitted according to the use and constitution of lithium secondary batteries.

A negative electrode may be manufactured in the same manner as the positive electrode, except that a negative active material is used instead of a positive active material.

The negative active material may be a carbonaceous material, silicon, a silicon oxide, a silicon-based alloy, a silicon-carbon-based material complex, tin, a tin-based alloy, a tin-carbon complex, a metal oxide, or a combination thereof.

The carbonaceous material may be a suitable carbonaceous material used in the art. In some implementations, the carbonaceous material may be crystalline carbon, amorphous carbon, or a mixture thereof. The crystalline carbon may be graphite such as natural graphite or artificial graphite that is in amorphous, plate, flake, spherical, or fibrous form. An amorphous carbon may be soft carbon (carbon calcined at low temperatures), hard carbon, mesophase pitch carbides, calcined cokes, graphene, carbon black, fullerene soot, carbon nanotubes, or carbon fiber.

The negative active material may be one selected from the group of Si, $SiO_x$ where $0 < x < 2$, for example $0.5 < x < 1.5$, Sn, $SnO_2$, a Si-containing metal alloy, and mixtures thereof. A metal alloyable with Si may be one selected from the group of aluminum (Al), tin (Sn), silver (Ag), iron (I), bismuth (Bi), manganese (Mg), zinc (Zn), indium (In), germanium (Ge), lead (Pb), and titanium (Ti).

The negative active material may be a metal/metalloid alloyable with lithium, or an alloy or oxide thereof. For example, the metal/metalloid alloyable with lithium may be Si, Sn, Al, Ge, Pb, Bi, antimony (Sb), a Si—Y' alloy (where Y' is a variable representing an alkali metal, an alkali earth metal, Groups 13 to 16 elements, a transition metal, a rare earth element, or a combination thereof, except that Y' is not Si), a Sn—Y" alloy (where Y" is a variable representing an alkali metal, an alkali earth metal, a groups 13 to 16 element, a transition metal, a rare earth element, or a combination thereof, except that Y" is not Sn), $MnO_x$ where $0 < x \leq 2$, or the like. Examples of Y' and Y" may include Mg, calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and combinations thereof. For example, the oxide of the metal/metalloid alloyable with lithium may be lithium titanium oxide, vanadium oxide, lithium vanadium oxide. $SnO_2$, $SiO_x$ where $0<x<2$, or the like.

For example, the negative active material may include at least one element selected from the group of Groups 13 to 16 elements.

For example, the negative active material may include at least one element selected from the group of Si, Ge, and Sn.

In the negative active material composition, a conductive agent, a binder, and a solvent that are the same as those used in the positive active material composition may be used. In this regard, the amounts of the negative active material, the conductive agent, the binder, and the solvent may be the same level as those used in a general lithium battery.

A separator may be disposed between the positive electrode and the negative electrode. An insulating thin film having high ion permeability and mechanical strength may be used as the separator.

The separator may have a pore diameter of 0.01 to 10 μm and a thickness of 5 to 20 μM. Materials for the separator may include sheets or non-woven fabrics made of an olefin-based polymer such as polypropylene or the like; or glass fibers or polyethylene. When a solid polymer electrolyte is used, the solid polymer electrolyte may also serve as a separator.

The separator made of an olefin-based polymer may be, for example, a single layer of polyethylene, polypropylene, or polyvinylidene fluoride, or multiple layers of at least two of these materials, or a mixed multi-layer, such as a polyethylene/polypropylene layer, a polyethylene/polypropylene/polyethylene layer, or a polypropylene/polyethylene/polypropylene layer.

A lithium salt-containing non-aqueous electrolyte may include a non-aqueous electrolyte and a lithium salt.

A non-aqueous electrolytic solution, an organic solid electrolyte, or an inorganic solid electrolyte may be used as the non-aqueous electrolyte.

The non-aqueous electrolytic solution may include a suitable organic solvent used in the art. In some implementations, the non-aqueous electrolytic solution may be propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydroxy franc, 2-methyl tetrahydrofuran, γ-butyrolactone, dioxolane, 4-methyldioxolane, N,N-dimethylformamide, N,N-dimethylacetamide, dimethylsulfoxide, dioxane, 1,2-dimethoxy ethane, sulfolane, dichloroethane, chlorobenzene, nitrobenzene, diethylene glycol, dimethyl ether, or a mixture thereof.

Examples of the organic solid electrolyte may include polyethylene derivatives, polyethylene oxide derivatives, polypropylene oxide derivatives, phosphoric acid ester polymers, polyester sulfide, polyvinyl alcohols, polyvinylidene fluoride, and polymers containing ionic dissociation groups.

Examples of the inorganic solid electrolyte may include nitrides, halides and sulfates of lithium (Li) such as $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt may be a material that is readily soluble in the non-aqueous electrolyte. Examples thereof include $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are natural numbers, LiCl, LiI, a mixture thereof, or the like. In addition, in order to enhance charge/discharge characteristics and flame retardancy, for example, pyridine, triethylphosphite, triethanolamine, cyclic ether, ethylenediamine, n-glyme, hexamethylphosphoramide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like, may be added. In some cases, in order to impart incombustibility, the electrolyte may further include a halogen-containing solvent such as carbon tetrachloride, ethylene trifluoride, or the like.

As illustrated in FIG. 1, a lithium secondary battery 11 may include a positive electrode 13, a negative electrode 12, and a separator 14. The positive electrode 13, the negative electrode 12, and the separator 14 may be wound or folded and accommodated in a battery case 15. Subsequently, an organic electrolytic solution may be injected into the battery case 15 and the battery case 15 may be sealed with a cap assembly 16, thereby completing the manufacture of the lithium secondary battery 11. The battery case 15 may be a cylindrical type, a rectangular type, a thin film type, or the like.

A battery assembly may be formed by interposing the separator 14 between the positive electrode 13 and the negative electrode 12. Battery assemblies may be stacked in a bi-cell structure, and then impregnated with an organic electrolytic solution. The obtained resultant may be housed in a pouch and sealed, thereby completing the manufacture of a lithium ion polymer battery.

A plurality of battery assemblies may be stacked on each other to form a battery pack. The battery pack may be used in high-capacity and high-output devices. For example, the battery pack may be used in notebook computers, smart phones, electric vehicles, or the like.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1: Preparation of Composite Positive Active Material (the Amount of Al=5 Mol %)

First, nickel cobalt oxide ($Ni_{0.8}Co_{0.2}O$) was obtained according to the following processes.

Nickel oxide as a nickel precursor was mixed with cobalt oxide as a cobalt precursor and the mixture was heat-treated under an oxidative gas atmosphere at about 700° C. to obtain nickel cobalt oxide ($Ni_{0.8}Co_{0.2}O$). The amounts of nickel oxide and cobalt oxide were controlled to obtain nickel cobalt oxide ($Ni_{0.8}Co_{0.2}O$).

The obtained nickel cobalt oxide ($Ni_{0.8}Co_{0.2}O$) was dry-mixed with aluminum oxide ($Al_2O_3$) and the mixture was heat-treated under an oxidative gas atmosphere (oxygen:air=80 volume %:20 volume %) at about 700° C. to obtain nickel cobalt aluminum oxide ($Ni_{0.8}Co_{0.15}Al_{0.05}O$). The amounts of the nickel cobalt oxide and the aluminum oxide were stoichiometrically controlled to obtain nickel cobalt aluminum oxide ($Ni_{0.8}Co_{0.15}Al_{0.05}O$) as a target material.

The nickel cobalt aluminum oxide ($Ni_{0.8}Co_{0.15}Al_{0.05}O$) was mixed with lithium hydroxide as a lithium precursor to obtain a composite positive active material composition. A mixing ratio of nickel cobalt aluminum oxide and lithium hydroxide was stoichiometrically controlled to obtain the composition of the target material ($LiNi_{0.8}Co_{0.15}Al_{0.05}O_2$).

The composite positive active material composition was heat-treated under an oxidative gas atmosphere (oxygen:nitrogen=20 volume %:80 volume %) at about 760° C. to obtain a composite positive active material ($LiNi_{0.8}Co_{0.15}Al_{0.05}O_2$).

Example 2: Composite Positive Active Material (the Amount of Al=10 Mol %)

A composite positive active material ($LiNi_{0.8}Co_{0.1}Al_{0.1}O_2$) was prepared in the same manner as in Example 1, except that the mixing ratio of nickel cobalt oxide ($Ni_{0.8}Co_{0.2}O$) and aluminum oxide ($Al_2O_3$) was controlled to obtain nickel cobalt aluminum oxide ($Ni_{0.8}Co_{0.1}Al_{0.1}O$).

Comparative Example 1: Composite Positive Active Material

Nickel cobalt hydroxide ($Ni_{0.8}Co_{0.2}OH$) was mixed with aluminum hydroxide ($Al(OH)_3$) and the mixture was heat-treated under an air atmosphere at about 700° C. to obtain nickel cobalt aluminum oxide ($Ni_{0.8}Co_{0.15}Al_{0.05}O$).

The nickel cobalt aluminum oxide ($Ni_{0.8}Co_{0.15}Al_{0.05}O$) was mixed with lithium hydroxide as a lithium precursor, water was added thereto, and the resultant solution was mixed to obtain a composite positive active material composition. In this regard, a mixing ratio of the nickel cobalt aluminum oxide and the lithium hydroxide was stoichiometrically controlled to obtain the composition of a target material ($LiNi_{0.8}Co_{0.15}Al_{0.05}O_2$).

The composite positive active material composition was heat-treated under an oxidative gas atmosphere (oxygen:air=80 volume %:20 volume %) at about 800° C. to obtain a composite positive active material ($LiNi_{0.8}Co_{0.15}Al_{0.05}O_2$).

Comparative Example 2: Composite Positive Active Material

A composite positive active material was prepared in the same manner as in Comparative Example 1, except that aluminum oxide ($Al_2O_3$) was used instead of aluminum hydroxide ($Al(OH)_3$).

Manufacture Example 1: Manufacture of Lithium Secondary Battery (Coin-Type Half Cell)

A coin-type half cell was manufactured according to the following processes by using the composite positive active material prepared according to Example 1.

Air bubbles were removed using a mixer from a mixture of the composite positive active material of Example 1, polyvinylidene fluoride, and carbon black as a conductive agent to prepare a uniformly dispersed slurry for forming a positive active material layer. Here, N-methylpyrrolidone was added as a solvent to the mixture, and a mixing ratio of the composite positive active material of Example 1, polyvinylidene fluoride, and carbon black was 92:4:4.

The slurry prepared according to the processes described above was coated onto Al foil by using a doctor blade to fabricate a thin electrode plate. The thin electrode plate was dried at 135° C. for more than 3 hours, followed by pressing and vacuum drying processes, thereby completing the manufacture of a positive electrode.

The positive electrode and a lithium metal electrode as a counter electrode were used to manufacture a 2032-type coin half-cell. A separator (thickness: about 16 μm) made of a porous polyethylene (PE) film was interposed between the positive electrode and the lithium metal electrode and an electrolyte was injected therebetween, thereby completing the manufacture of a coin half-cell. As the electrolyte, a solution containing 1.1 M $LiPF_6$ dissolved in a solvent mixture of ethylene carbonate (EC), ethyl methyl carbonate (EMC), and dimethyl carbonate (DMC) in a volume ratio of 3:4:3 was used.

Manufacture Example 2

A coin cell was manufactured in the same manner as in Manufacture Example 1, except that the composite positive active material prepared according to Example 2 was used instead of the composite positive active material of Example 1.

Comparative Manufacture Examples 1 and 2

Coin half-cells were manufactured in the same manner as in Manufacture Example 1, except that the composite positive active materials prepared according to Comparative Examples 1 and 2 were used instead of the composite positive active material of Example 1.

Evaluation Example 1: X-Ray Diffraction Analysis

X-ray diffraction analysis was performed on the composite positive active material of Example 1 and the composite positive active materials of Comparative Examples 1 and 2 by using an X'pert pro (PANalytical) diffractometer using CuKα radiation (1.54056 Å).

Figure 2:
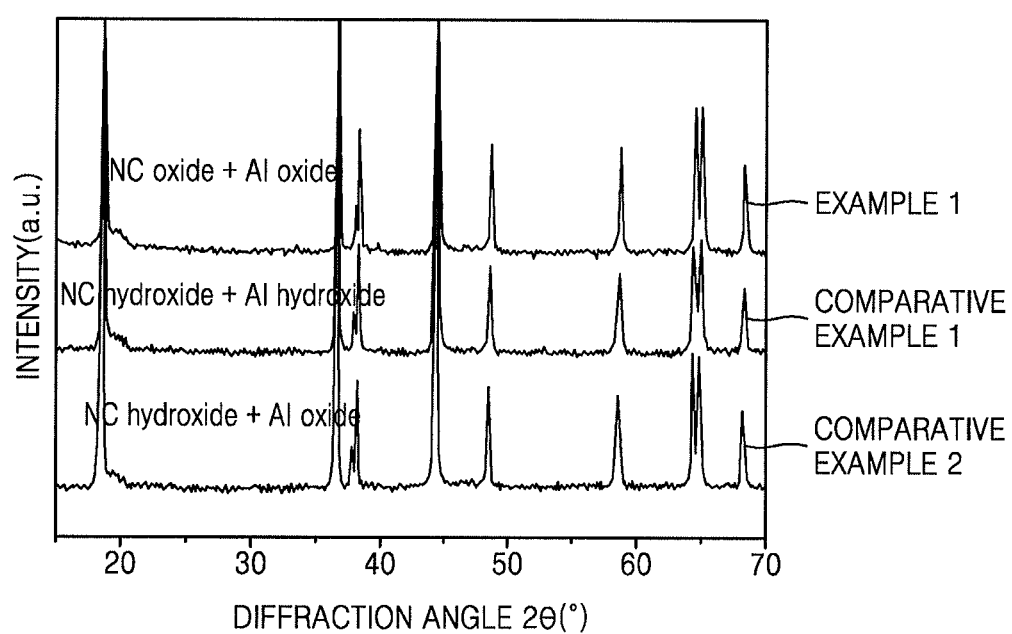
FIGS. 2 and 3 illustrate X-ray diffraction analysis results of composite positive active materials prepared according to Example 1 and Comparative Examples 1 and 2.
Figure 3:
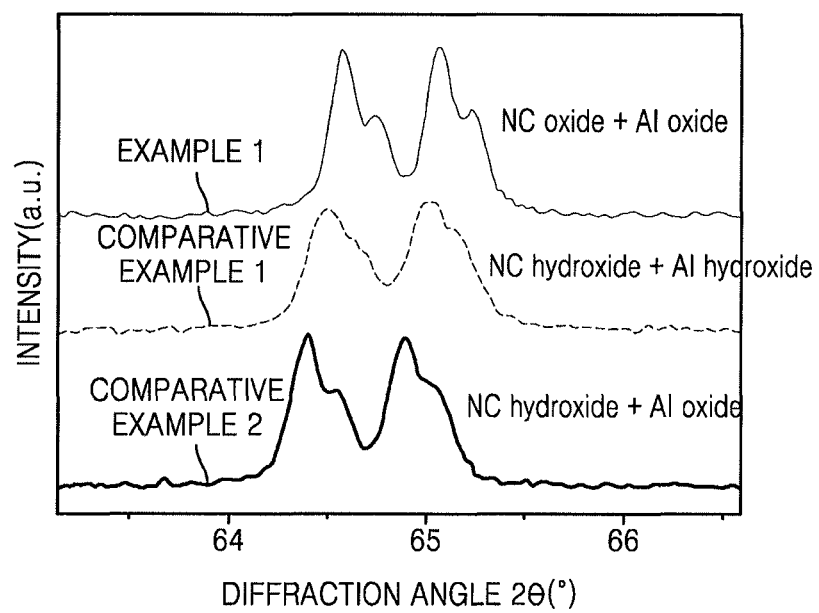

The X-ray diffraction analysis results are shown in FIGS. 2 and 3.

The following characteristics evaluated using the X-ray diffraction analysis results shown in FIGS. 2 and 3 are shown in Table 1 below.

(1) Cation Mixing Ratio

A cation mixing ratio may be obtained according to Equation 1 below by using an intensity ratio of a peak for a (003) plane (a peak appearing at 2θ of about 18° to about 19°) to a peak for a (104) plane (a peak appearing at 2θ of about 44.5°).

$$\text{Cation mixing ratio} = \{I_{(003)}/I_{(104)}\} \times 100 \quad \text{[Equation 1]}$$

In Equation 1 above, $I_{(003)}$ denotes the intensity of the peak for a (003) plane, and $I_{(104)}$ denotes the intensity of the peak for a (104) plane.

The peak for a (003) plane provides information on a layered structure of a positive active material and the peak for a (104) plane provides information on a layered and cubic rock-salt structure. As confirmed from Equation 1 above, the greater $I_{(003)}/I_{(104)}$, the smaller the cation mixing ratio.

(2) FWHM (104)

FWHM (104) denotes the width of a halfway point of the maximum height of the peak for a (104) plane (peak at 2θ of about 44.5°).

(3) FWHM (108)

FWHM (108) denotes the width of a halfway point of the maximum height of the peak for a (108) plane (peak at 2θ of about 65°).

(4) Residual Lithium

Residual lithium was evaluated using acid-base titration.

TABLE 1

| | Cation mixing ratio (%) | FWHM (104) | FWHM (108) | Residual lithium (wt %) |
|---|---|---|---|---|
| Example 1 | 2.51 | 0.1394 | 0.1474 | 0.55 |
| Comparative Example 1 | 5.92 | 0.1764 | 0.2057 | 0.7 |
| Comparative Example 2 | 5.97 | 0.1528 | 0.1651 | 0.8 |

As shown in Table 1 above, it is confirmed that the composite positive active material prepared according to Example 1 exhibits smaller FWHM (104) and FWHM (108) values than the composite positive active materials prepared according to Comparative Examples 1 and 2. From the results above, it is confirmed that the composite positive active material of Example 1 has good crystallinity as compared to the composite positive active materials of Comparative Examples 1 and 2.

In addition, the composite positive active material of Example 1 is shown to have a smaller cation mixing ratio than the composite positive active materials of Comparative Examples 1 and 2. A smaller cation mixing ration may enable a higher capacity of a lithium battery using the composite positive active material. In addition, as shown in Table 1 above, the composite positive active material of Example 1 exhibits smaller residual lithium content than the composite positive active materials of Comparative Examples 1 and 2. Thus, gas generation due to the residual lithium may be prevented or minimized, such that high safety may be achieved.

Evaluation Example 2: Charge and Discharge Characteristics

Charge and discharge characteristics and the like of the coin half-cells manufactured according to Manufacture Example 1 and Comparative Manufacture Examples 1 to 3 were evaluated using a charger/discharger (Manufacturer: TOYO, Model: TOYO-3100).

A $1^{st}$ charging and discharging cycle was performed such that charging was performed at a constant current of 0.1 C until the voltage reached 4.3 V and, thereafter, constant voltage charging was performed until the current reached 0.05 C. The charging-completed cell was rested for about 10 minutes, and then discharging was performed at a constant current of 0.1 C until the voltage reached 3 V. A $2^{nd}$ charging and discharging cycle was performed such that charging was performed at a constant current of 0.2 C until the voltage reached 4.3 V and, thereafter, constant voltage charging was performed until the current reached 0.05 C. The charging-completed cell was rested for about 10 minutes, and then discharging was performed at a constant current of 0.2 C until the voltage reached 3 V.

Figure 4:
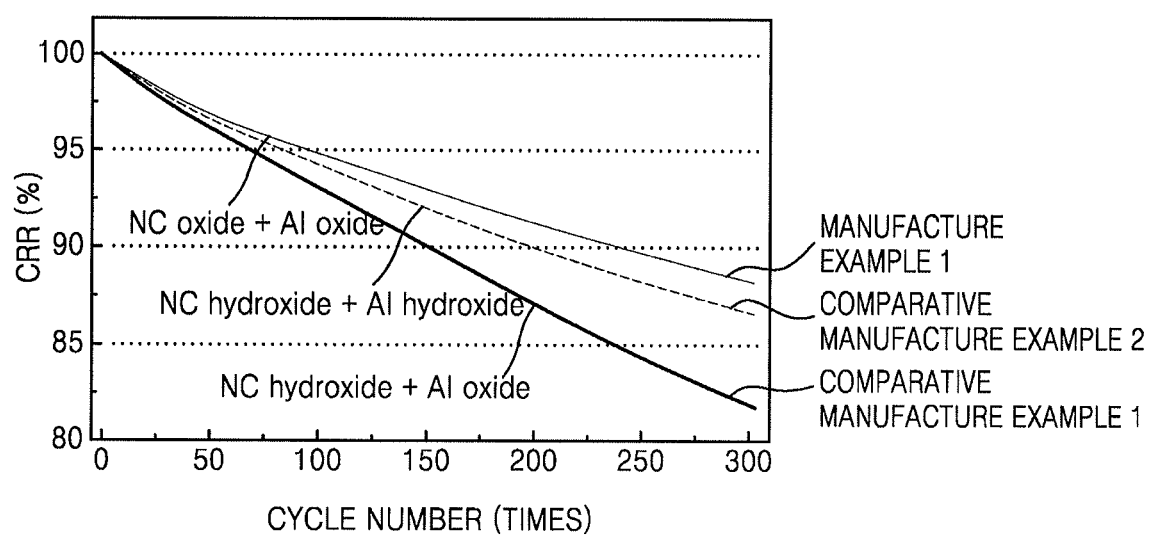
FIG. 4 illustrates a graph showing lifespan characteristics of coin half-cells manufactured according to Manufacture Example 1 and Comparative Manufacture Examples 1 and 2.

The lifespan of each of the coin half cells was evaluated as follows. Charging was performed at a constant current of 1 C until the voltage reached 4.3 V and, thereafter, constant voltage charging was performed until the current reached 0.05 C. The charging-completed cell was rested for about 10 minutes, and then discharging was performed at a constant current of 1 C until the voltage reached 3 V. The charging and discharging cycle was repeated 300 times. The evaluation results are shown in FIG. 4. A capacity retention ratio (CRR) was calculated using Equation 3 below:

Capacity retention ratio [%]=[discharge capacity of $300^{th}$ cycle/discharge capacity of $1^{st}$ cycle]×100   [Equation 3]

As shown in FIG. 4, it is confirmed that the coin half-cell of Manufacture Example 1 exhibited a higher capacity retention ratio than the coin half-cells of Comparative Manufacture Examples 1 and 2.

As is apparent from the foregoing description, a lithium secondary battery using a positive electrode including a composite positive active material according to an embodiment may have enhanced lifespan and safety characteristics.

By way of summation and review, it is desirable for lithium secondary batteries for use in fields including high-performance electric vehicles and the like to have a high capacity, high output, and high safety.

Lithium cobalt oxides (for example, $LiCoO_2$) are widely used as positive active materials of lithium secondary batteries. However, such lithium cobalt oxides include cobalt, which is relatively expensive, and thus raw material costs thereof are high. In addition, the positive active material may have insufficient capacity.

Nickel-based lithium composite oxides are less expensive in terms of preparation costs and may have superior properties, e.g., high capacity and the like, as compared to lithium cobalt oxides. However, general nickel-rich lithium composite oxides may have low crystallinity and high cation mixing ratios and thus may not have satisfactory capacity and lifespan properties. Accordingly, there is still room for improvement. Thus, research into nickel-based lithium composite oxides is actively underway.

Embodiments are directed to composite positive active materials having high crystallinity and low cation mixing ratios. According, such composite positive active materials may have excellent capacity properties and lithium secondary batteries including positive electrodes including the composite active materials and having enhanced lifespan characteristics. Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composite positive active material comprising a lithium nickel cobalt aluminum composite oxide that consists of lithium, nickel, cobalt, aluminum, and oxygen, wherein:

a full width at half maximum (FWHM) of a peak of a (104) plane of the lithium nickel cobalt aluminum composite oxide is 0.15 or less, an FWHM of a peak of a (108) plane of the lithium nickel cobalt aluminum composite oxide is 0.15 or less, the peaks being obtained by X-ray diffraction analysis using a CuKα X-ray, and the composite positive active material has an average crystal size of 800 nm or less.

2. The composite positive active material as claimed in claim 1, wherein an amount of aluminum in the composite positive active material is in a range of about 5 mol % to about 10 mol % with respect to a total amount of nickel, cobalt, and aluminum.

3. The composite positive active material as claimed in claim 1, wherein a cation mixing ratio in the composite positive active material is 5.0% or less based on a total amount of lithium sites.

4. The composite positive active material as claimed in claim 1, wherein the composite positive active material is a compound represented by Formula 1 below:

$$LiNi_aCo_bAl_cO_2, \qquad \text{[Formula 1]}$$

wherein in formula 1, $0.7 \leq a < 1.0$, $0 < b \leq 0.3$, and $0.05 \leq c \leq 0.1$.

5. The composite positive active material as claimed in claim 1, wherein the composite positive active material is $LiNi_{0.8}Co_{0.1}Al_{0.1}O_2$, $LiNi_{0.7}Co_{0.2}Al_{0.1}O_2$, $LiNi_{0.7}Co_{0.25}Al_{0.05}O_2$, $LiNi_{0.8}Co_{0.15}Al_{0.05}O_2$, or $LiNi_{0.9}Co_{0.05}Al_{0.5}O_2$.

6. A method of preparing the composite positive active material as claimed in claim 1, the method comprising:
performing a first heat treatment on nickel cobalt oxide represented by Formula 2 below and aluminum oxide under an oxidative gas atmosphere to obtain nickel cobalt aluminum oxide represented by Formula 3 below; and
performing a second heat treatment on the nickel cobalt aluminum oxide and a lithium precursor under an oxidative gas atmosphere to obtain the composite positive active material, $$Ni_xCo_{1-x}O \qquad \text{[Formula 2]}$$

wherein in formula 2, $0.7 \leq x < 1.0$, $$Ni_xCo_{1-x-y}Al_yO_2 \qquad \text{[Formula 3]}$$

wherein in formula 3, $0.7 \leq x < 1.0$ and $0.05 \leq y \leq 0.1$.

7. The method as claimed in claim 6, wherein the first heat treatment is performed under an oxidative gas atmosphere at a temperature between about 400° C. and about 1,200° C.

8. The method as claimed in claim 6, wherein the second heat treatment is performed under an oxidative gas atmosphere at a temperature between about 400° C. and about 1,200° C.

9. A lithium secondary battery comprising a positive electrode including a composite positive active material including a lithium nickel cobalt aluminum composite oxide that consists of lithium, nickel, cobalt, aluminum, and oxygen, wherein the composite positive active material has:
a full width at half maximum (FWHM) of a peak of a (104) plane of 0.15 or less,
an FWHM of a peak of a (108) plane of 0.15 or less, the peaks being obtained by X-ray diffraction analysis using a CuKα X-ray, and
an average crystal size of 800 nm or less.

10. The lithium secondary battery as claimed in claim 9, wherein an amount of aluminum in the composite positive active material is in a range of about 5 mol % to about 10 mol % with respect to a total amount of nickel, cobalt, and aluminum.

11. The lithium secondary battery as claimed in claim 9, wherein a cation mixing ratio in the composite positive active material is 5.0% based on a total amount of lithium sites.

12. The lithium secondary battery as claimed in claim 9, wherein the composite positive active material is a compound represented by Formula 1 below:

$$LiNi_aCo_bAl_cO_2, \qquad \text{[Formula 1]}$$

wherein $0.7 \leq a < 1.0$, $0 < b \leq 0.3$, and $0.05 \leq c \leq 0.1$.

13. The lithium secondary battery as claimed in claim 9, wherein the composite positive active material is $LiNi_{0.8}Co_{0.1}Al_{0.1}O_2$, $LiNi_{0.7}Co_{0.2}Al_{0.1}O_2$, $LiNi_{0.7}Co_{0.25}Al_{0.05}O_2$, $LiNi_{0.8}Co_{0.15}Al_{0.05}O_2$, or $LiNi_{0.9}Co_{0.05}Al_{0.5}O_2$.

* * * * *